(12) United States Patent
Volkmann et al.

(10) Patent No.: US 9,150,184 B2
(45) Date of Patent: Oct. 6, 2015

(54) AIR BAG HAVING A SLIT IN A BORDER REGION

(75) Inventors: Matthias Volkmann, Kronberg (DE); Marko Morhard, Mainaschaff (DE); Volker Hofmann, Frankfurt (DE); Gregor Gromodka, Frankfurt am Main (DE); Lars Schimek, Eltville (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 13/519,180

(22) PCT Filed: Dec. 21, 2010

(86) PCT No.: PCT/US2010/061441
§ 371 (c)(1),
(2), (4) Date: Sep. 17, 2012

(87) PCT Pub. No.: WO2011/082016
PCT Pub. Date: Jul. 7, 2011

(65) Prior Publication Data
US 2013/0093167 A1 Apr. 18, 2013

Related U.S. Application Data

(60) Provisional application No. 61/290,640, filed on Dec. 29, 2009.

(51) Int. Cl.
*B60R 21/232* (2011.01)
*B60R 21/233* (2006.01)
*B60R 21/2342* (2011.01)
*B60R 21/201* (2011.01)

(52) U.S. Cl.
CPC ............. *B60R 21/233* (2013.01); *B60R 21/201* (2013.01); *B60R 21/232* (2013.01); *B60R 21/2342* (2013.01)

(58) Field of Classification Search
CPC .. B60R 21/201; B60R 21/232; B60R 21/233; B60R 21/2334; B60R 21/2342; B60R 2021/23386
USPC ........................ 280/728.2, 730.2, 743.1, 743.2
See application file for complete search history.

(56) References Cited

U.S. PATENT DOCUMENTS

| | | | | |
|---|---|---|---|---|
| 6,149,185 | A * | 11/2000 | White et al. | 280/728.2 |
| 6,471,240 | B2 * | 10/2002 | Bakhsh et al. | 280/729 |
| 7,077,425 | B2 * | 7/2006 | Ogawa et al. | 280/730.2 |
| 7,264,267 | B2 * | 9/2007 | Kino et al. | 280/728.2 |
| 7,357,408 | B2 * | 4/2008 | Hall et al. | 280/728.2 |
| 8,006,999 | B2 * | 8/2011 | Suemitsu et al. | 280/730.2 |
| 8,240,701 | B2 * | 8/2012 | Cheal et al. | 280/728.2 |
| 8,414,014 | B2 * | 4/2013 | Nogami et al. | 280/728.2 |
| 2005/0206138 | A1 * | 9/2005 | Breuninger et al. | 280/729 |
| 2006/0157958 | A1 * | 7/2006 | Heudorfer et al. | 280/730.2 |
| 2006/0192368 | A1 | 8/2006 | Hall | |

FOREIGN PATENT DOCUMENTS

| | | |
|---|---|---|
| JP | 2003231452 | 8/2003 |
| WO | 2008065964 | 6/2008 |

* cited by examiner

*Primary Examiner* — Paul N Dickson
*Assistant Examiner* — Timothy Wilhelm
(74) *Attorney, Agent, or Firm* — Markell Seitzman (57) ABSTRACT

An air bag (20) for use in a vehicle (200) having a border region (22) having a top (24) situated about at least one inflatable region (30, 30a, 30b); the top of the border region configured to be secured directly or indirectly to a portion of the vehicle or component of the vehicle; wherein the border region includes at least one slit.

11 Claims, 8 Drawing Sheets

AIR BAG HAVING A SLIT IN A BORDER REGION

This application claims the benefit of U.S. Provisional Application 61/290,640, filed on Dec. 29, 2009. The disclosure of the above application is incorporated herein by reference.

BACKGROUND AND SUMMARY OF THE INVENTION

The present invention relates to air bags for protecting a vehicle occupant.

The preferred embodiment of the present invention is described in the context of a curtain air bag that is deployable from a roof rail of the vehicle. The prior art illustrates curtain air bags with a peripheral border fastened directly or indirectly to a roof rail. In one variation a tab is sewn to the top of the border and a fastener is inserted through the tab into the roof rail. The tab can also be an integral part of the border region or main panel of the air bag. It is not necessary to use a tab, for example the top of the border region may include one or more fastener holes and a fastener is received through each hole. When an air bag inflates it does so rapidly, moving a mass of material from a folded configuration to its expanded, inflated configuration. As the air bag inflates the various stresses are created in the air bag at the point of attachment to the vehicle; generally at or about the mounting hole or fastener. The present invention substantially reduces these stresses providing for a more robust airbag.

More specifically the invention comprises: an air bag for use in a vehicle comprising: a border region having a top situated about at least one inflatable region; the top of the border region configured to be secured directly or indirectly to a portion of the vehicle or component of the vehicle; wherein the border region includes at least one slit. The inclusion of one or more slits permits the top of the border region to deform as the air bag deploys to its inflated condition; as the slit is stretched and opens, energy is absorbed and less stress is seen on those portions secured to the vehicle or to a vehicle component. An additional benefit of the present invention is that the incorporation of the slits permits the bottom (or generally an opposite end, side or region) of the air bag to extend further away from the mounting locations than could be achieved without the slits thereby increasing the effective size of the air bag. This feature permits a smaller air bag to replace a larger prior art air bag.

DETAILED DESCRIPTION OF THE DRAWINGS

Figure 1:
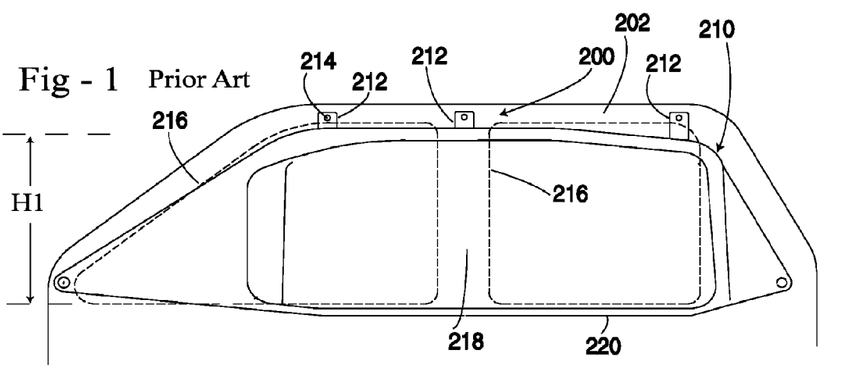
FIG. 1 is illustrative of the prior art.
Figure 2:
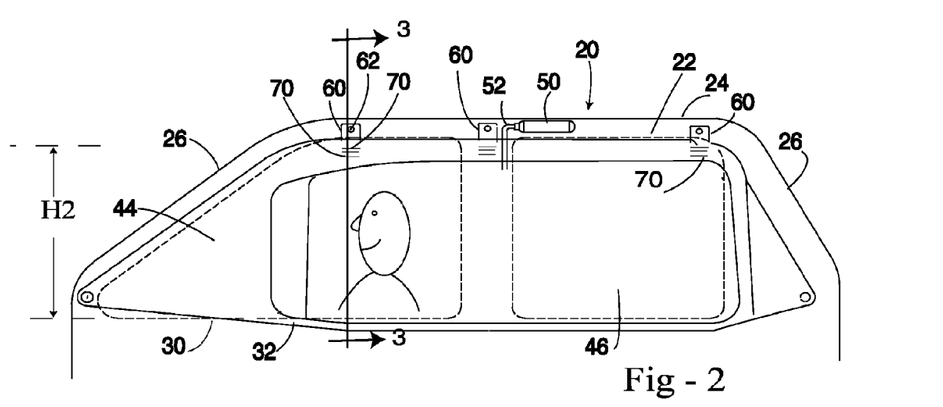
FIG. 2 shows a curtain airbag incorporating the present invention laid flat such as against a side of the vehicle.

FIG. 1 illustrates a view of the typical passenger compartment of the vehicle 200. Illustrated is roof rail 202 with a curtain airbag 210 mounted to the vehicle; this air bag is shown in greater detail in other figures. Air bag 210 includes a plurality of tabs 212; each tab includes a mounting hole 214 through which a fastener (not shown) is received and secured to the roof rail 202 in a known manner. Air bag 210 is illustrated in its inflated state covering various windows 216 (shown in phantom line) and vehicle parts. The vehicle B-pillar 218 is diagrammatically illustrated. As can be appreciated air bag 210 deploys downwardly, the height H1 of the air bag is chosen so the lower portion 220 of the deployed air bag is at or slightly below the bottom of each window. During the initial deployment of the air bag various forces are generated as the air bag moves from its stored configuration. These forces are transmitted to the tabs which hold the top of the air bag in place. As can be appreciated, the top border portion of the air bag as well as the tabs must be designed to absorb these forces without tearing, which in general will increase the cost of the air bag. Further, as the air bag reaches its full extension, additional stresses are created on the tabs (points of attachment) and in the area of the air bag below the tabs. If it were possible to utilize a shorter air bag but one having an effective height of at least equal to H1 when deployed, this shorter or smaller air bag may also be less costly as less material is used in its construction. As will be seen from the description below this is one of the additional benefits of the present invention.

Figure 3:
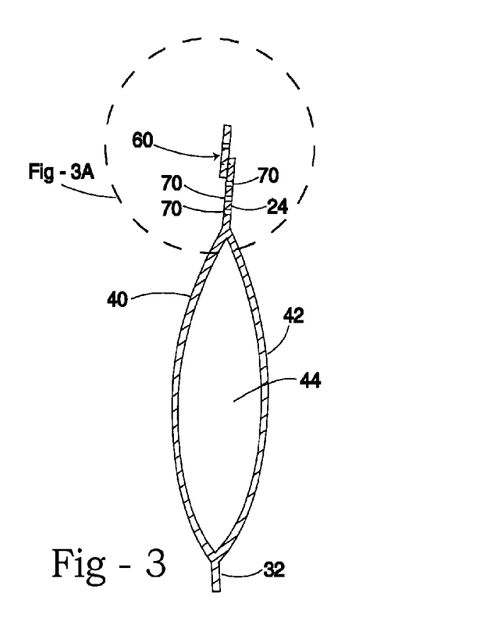
FIG. 3 is a cross-sectional view through section 3-3 of FIG. 2.

Reference is initially made to FIGS. 2, 3, 3A and 3B which show various features of the present invention. Air bag 20 includes a border region 22 with top 24 and side border regions 26. The lower portion or bottom 30 of the air bag 20 may or may not include a discrete lower border region such as 32. One such border region could be a sewn hem or woven edge. For example, if the air bag 20 is manufactured utilizing a large main panel that is folded in half and then sewn together, wits the fold line or fold located at the bottom of the air bag, there is no lower border region. If however, the air bag is manufactured utilizing a weaving process, (the resulting air bag often referred to as a one-piece-woven air bag) this process will often create top, side and lower border regions as integral portions of the air bag. This type of air bag is illustrated in FIG. 3.

Figure 8:
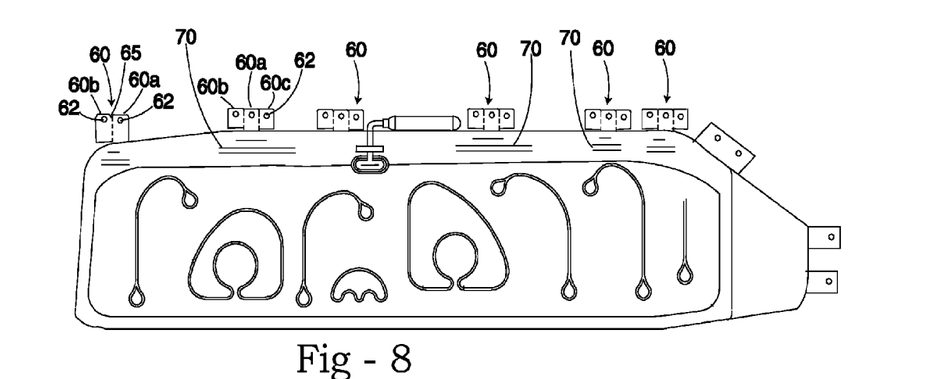
FIG. 8 is a plan view of a deflated air bag including the present invention and one which shows a further embodiment.

Air bag 20 further includes woven material panels 40 and 42 (regardless of whether the bag is sewn together or produced as a one-piece-woven bag) which define one or more inflatable regions 44 and/or 46. Inflation gas is provided to the inflatable regions 44 and 46 by an inflator 50. The inflator is diagrammatically shown in FIG. 2. The inflator is shown being connected to the inflatable region by a fill tube 52; other constructions are within the scope of the present invention, another inlet 53 is shown in FIG. 8. The specific construction of the air bag, its method of manufacturer, the placement of the inflator and the means by which inflation gas is received within the air bag will vary with application. In the illustrated embodiments, air bag 20 further includes a plurality of tabs 60 which are substantially identical to tabs 212 mentioned above. Each tab 60 includes a mounting opening 62 for a fastener such as threaded bolt or snap-in fastener. In FIG. 8 some tabs 60 are shown with a center portion 60a, a left-extending portion 60b and a right-extending portion 60c. Each center, left and right portion includes a fastener hole 62. The right and left extending portions are folded at a fold line 65 and upon folding overlay the center portion 60a with the various fastener holes aligned. Only the center portion is permanently affixed to bottom of the air bag main part. The bottom of portions 60b and 60c are detached from the main part of the air bag to permit them to be folded over.

Figure 3A:
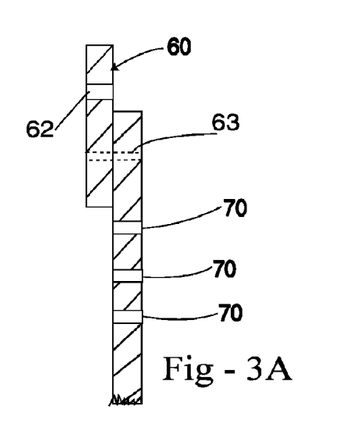
FIGS. 3A and 3B show enlarged portions of the air bag of FIGS. 2 and 3.
Figure 3B:
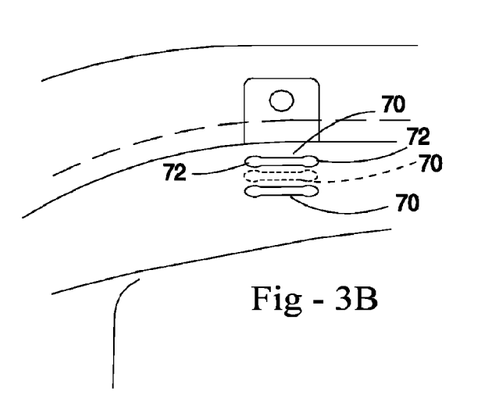

In general, each tab 60 identifies a mounting location or point of attachment for the air bag. As can be appreciated, and also shown in FIG. 6, the tabs 60 can be eliminated in which case mounting openings 62 extend through the top border region which, in order to provide extra space for the slits of the features of the present invention, may be of increased height. Situated below each mounting location are one or more closed slits or sets of closed slits 70 formed in the top border region 24. Each tab 60 can be a separate piece of material sewn along seam 63 to the main panel of the air bag or along the top border. As can be recognized, in the illustrated embodiment the top border region is not inflatable. Each slit 70 may further include a circular end region 72 or similarly purposed structure to reduce localized stress as the region of the bag about the slits is stressed. The slits 70 are also shown in FIGS. 3 and 3A. The height of the uninflated air bag 20 is identified as H2 and may be equal to or less than a corresponding height H1 of the prior art air bag.

Figure 4:
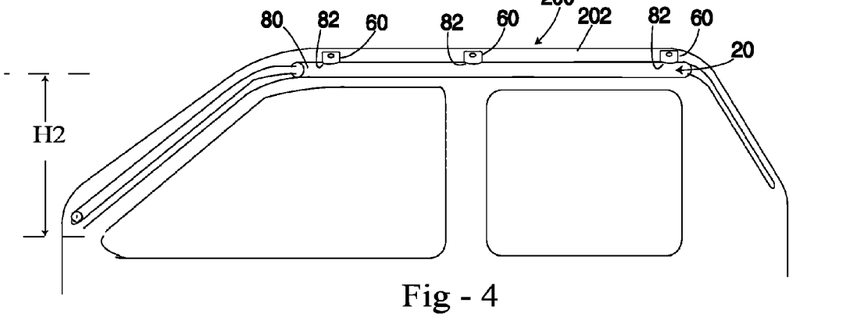
FIG. 4 diagrammatically shows a curtain airbag in its folded, stored configuration proximate the roof rail of the vehicle.

Reference is briefly made to FIG. 4 which shows the passenger compartment of FIG. 1 with air bag 20 in its stored configuration mounted to a roof rail 202. In this configuration, air bag 20 has been folded or rolled into an elongated configuration, and slid within a flexible, cylindrical shaped, breakable cover 80. The cover includes a plurality of openings 82 through which a respective tab 60 extends.

Figure 5:
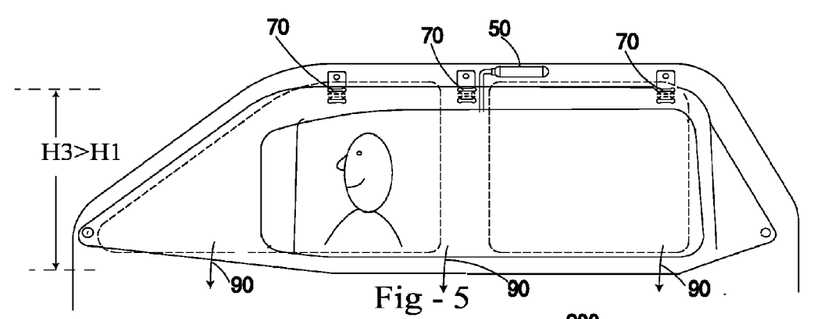
FIG. 5 illustrates a curtain airbag including the present invention in its deployed configuration.

FIG. 5 shows air bag 20 in its deployed state, protecting an occupant. Upon deployment of the air bag it breaks through its cover 80 and is positioned adjacent the sides of vehicle 200. As the air bag is inflated by the inflation gas it will gain momentum and move in a direction of deployment generally shown by arrows 90, which in FIG. 5 is a downward direction of deployment. For a curtain air bag the direction of deployment is generally downward. As the curtain air bag deploys downwardly, the forces created during deployment will tend to stretch or open in the various slits 70, which are diagrammatically shown in a stretched or open configuration in FIG. 5. By virtue of the fact that each slit or pair or pairs of slits previously closed are now stretched open, the height dimension between the top and the bottom of the air bag is locally increased, this dimension being shown by an increased height H3. In the illustrated embodiment the deployed air bag 20 has been configured so that this increased or stretched height, that is, dimension H3, is now equal to or greater than the height H1 of an inflated, conventional curtain air bag. As such, the present invention permits the use of a smaller air bag which is capable upon deployment to expand in size to protect the occupant or, if the same sized bag is used, the slits permit the bag to deploy lower along the side of the vehicle. In this case, the slits 70 are configured so that upon inflation, the now stretched slits permit the deployed bottom of the air bag to reach at or below the windows of the vehicle. Those experienced in the art are aware of the fact that when a curtain air bag inflates the height of the air bag lessens as the air bag approaches its inflated, more spherical shape. The increased stretchability of the border compensates for the reduction in height due to filling of the bag with gas.

Figure 6:
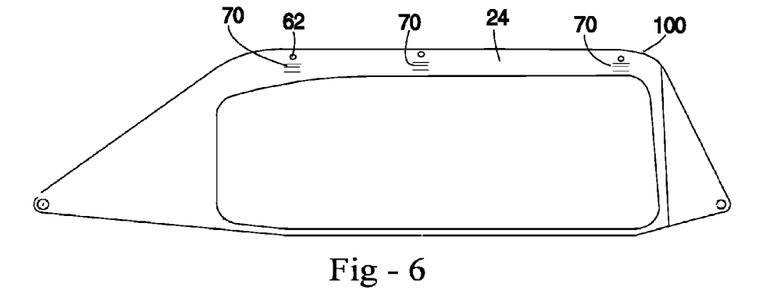
FIG. 6 illustrates an alternate embodiment of the present invention.

Reference is briefly made to FIG. 6 which shows an alternate embodiment of the invention. Air bag 100 is substantially the same as the air bag 20 of FIG. 2 with the exception of tabs 60. In this configuration mounting openings 62 are formed directly in the top border portion 24 of the air bag. The slits 70 are located below each mounting location, that is, below openings 62.

Figure 7:
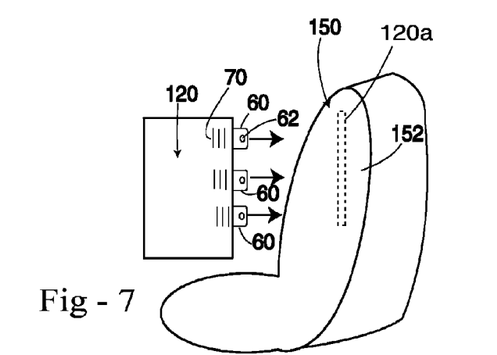
FIG. 7 illustrates a further alternate embodiment of the invention.

Reference is briefly made to FIG. 7 which illustrates another alternate embodiment of the present invention. In FIG. 7 the air bag is configured as a seat mounted side air bag 120. Air bag 120 includes tabs 60 and mounting holes 62 or could alternately include the wider border as shown in FIG. 6. One or more slits 70 are located adjacent to a mounting location 120a of the air bag 120. This type of air bag 120 is mounted within the back cushion 152 of the vehicle seat 150 and could alternatively be mounted to the pillar instead of inside the seat Further, this type of bag could also be mounted in the pillar in combination with a curtain airbag.

Upon inflation, air bag 120 will deploy outwardly from its mounting location such a back cushion 152 or vehicle pillar and move generally in a horizontal direction. The slits 70 when stretched open, permit the air bag to achieve a stretched-out configuration of a slightly greater dimension than if the slits were not used. The slits, as mentioned above, also function to reduce the stresses that are developed in the air bag 120 at its mounting locations. As can further be appreciated, the utilization of similar slits can be employed in other types of air bags such as passenger, driver and or knee air bags.

Figure 9:
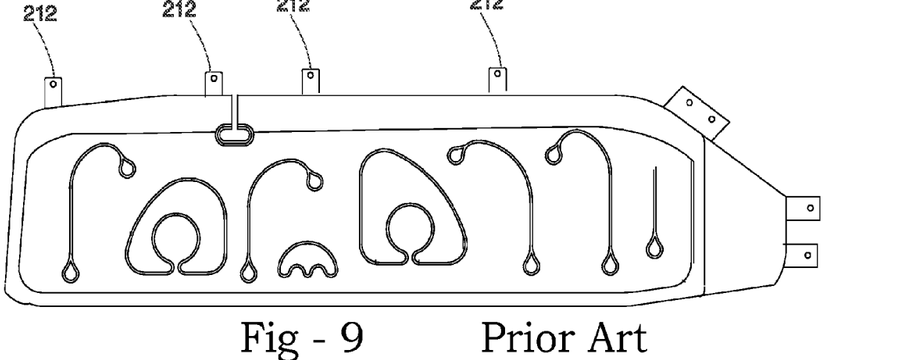
FIG. 9 shows another prior art curtain air bag.
Figure 10:
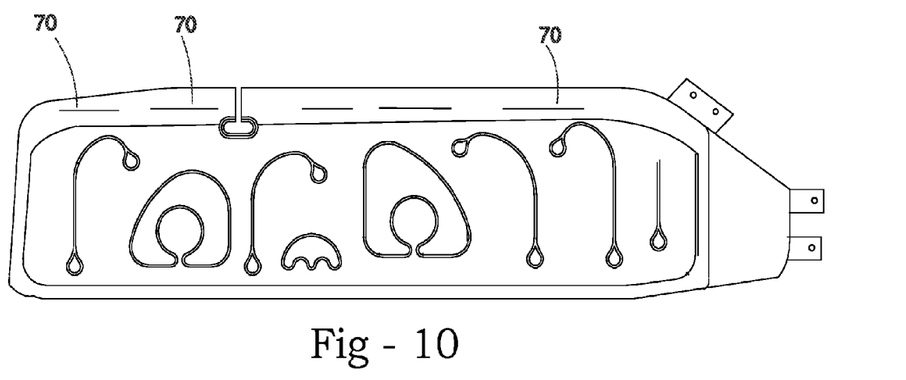
FIG. 10 shows the air bag of FIG. 9 without tabs and incorporating slits of the present invention.
Figure 11:
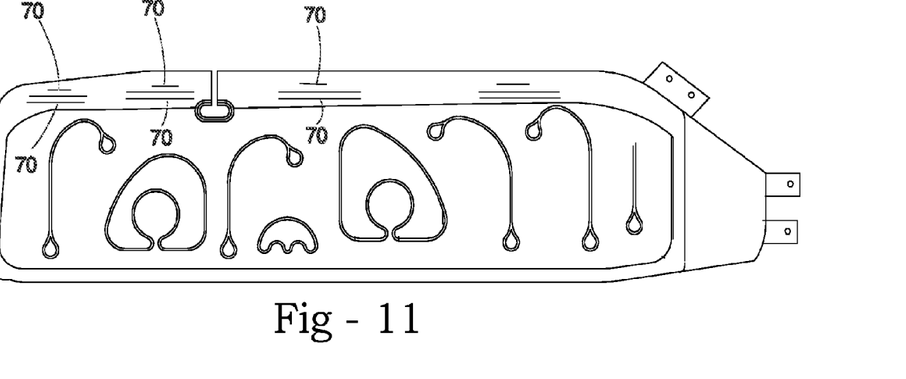
FIG. 11 shows an air bag with multiple slits in each mounting region.
Figure 12:
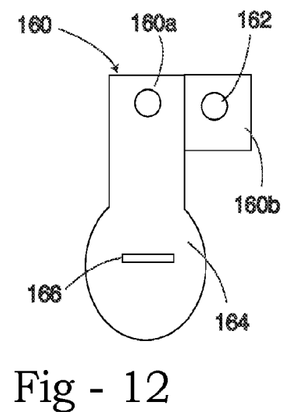
FIG. 12 shows an alternate embodiment of a tab that is looped about the top portion of the air bag.
Figure 13:
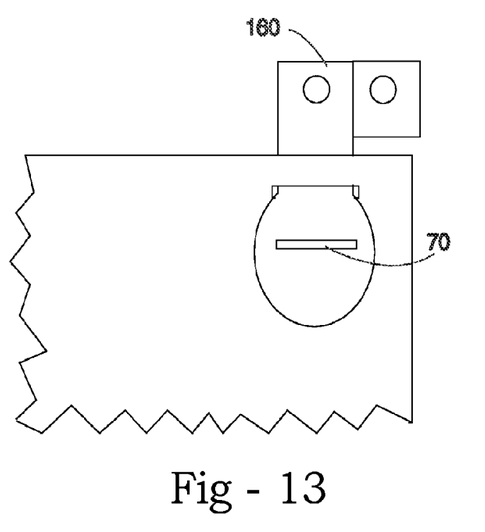
FIGS. 13 and 13A show how the tab of FIG. 12 is looped about a slit in the air bag.
Figure 13A:
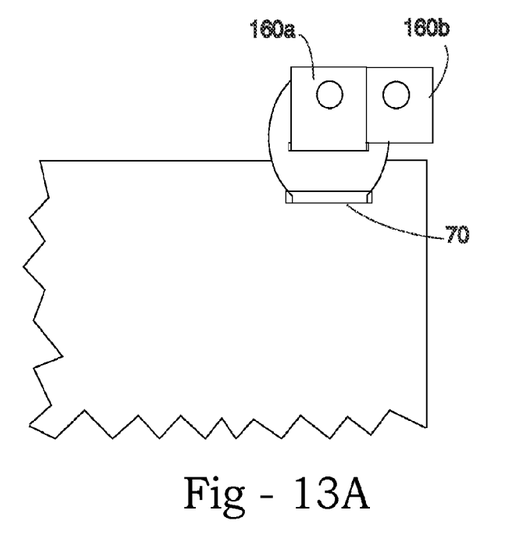

FIG. 9 shows another prior art curtain air bag, functionally similar to the bag shown in FIG. 1. This bag includes tabs 212 that could be sewn to or an integrally woven portion of the air bag. In FIG. 10 the tabs 212 have been eliminated and are not a fixed feature of the air bag and a single slit 70 added to the air bag below the location of the removed/missing tabs. FIG. 11 shows another embodiment of the invention including a plurality of slits 70a; the additional slits permit the bag to extended to a greater deployed length than when using a single relatively short slit. FIG. 12 shows an alternate tab 160, the tab includes a first upper portion 160a and a side portion 160b; the side portion 160a is foldable over the first upper portion about foldline 163. Each of the first upper and side portions include a fastener mounting hole 162. The fastener 160 includes an enlarged bottom portion with a slit or slot 166 (which are used interchangeably). FIGS. 13 and 13A show how the tab 160 of FIG. 12 is fitted to the air bag in FIGS. 10 and 11. The top portions of tab 160 are first slid into a single slit of FIG. 10 or into the topmost slit of the plurality of slits in FIG. 11 as shown in FIG. 13. The top portions of tab 160 are threaded into the slit 166 and moved upwardly toward a top edge of the air bag. This construction permits the use of a tab that is independent of the air bag. To reduce cost the tab can be made from waste material slated to be thrown away. The looped around tab can be tacked in place by sewing or other means.

Figure 14:
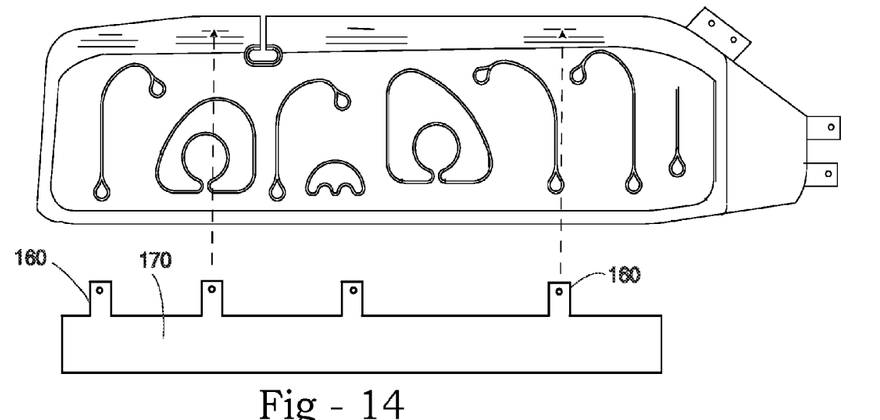
FIG. 14 shows another embodiment of the invention.
Figure 15:
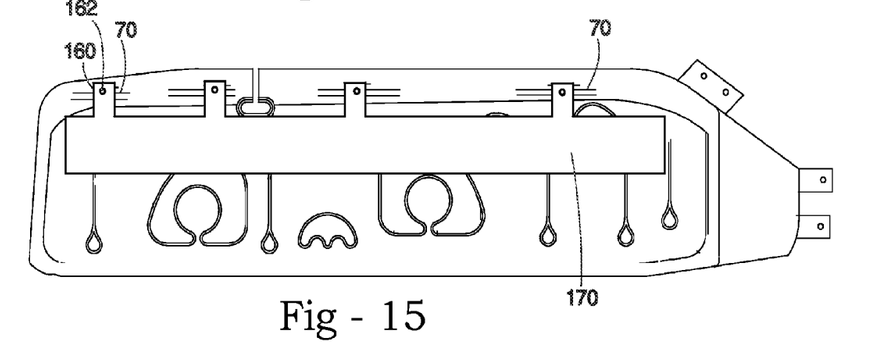
FIGS. 15 and 16 show steps in the construction of the air bag of FIG. 14.
Figure 16:
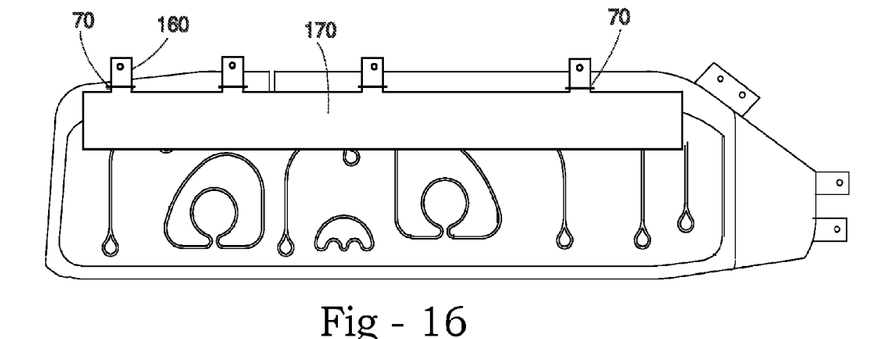
Figure 17:
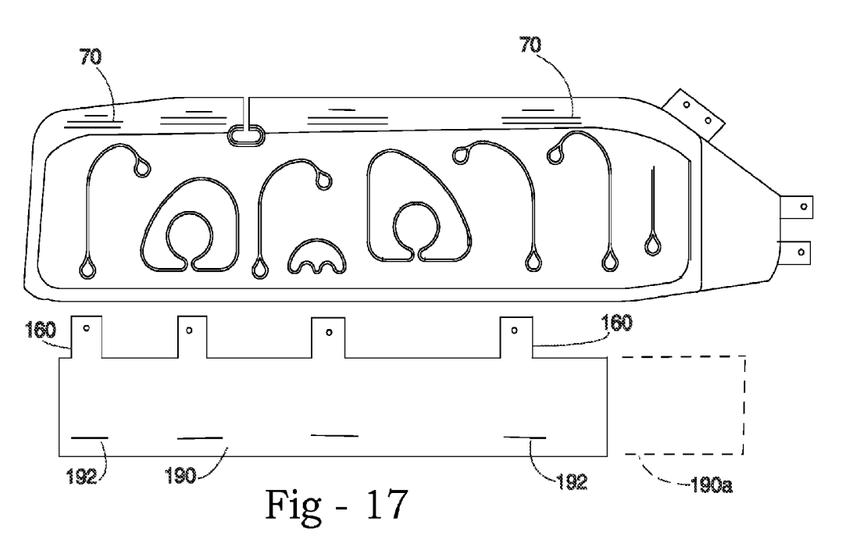
FIG. 17 shows another embodiment of the invention.
Figure 18:
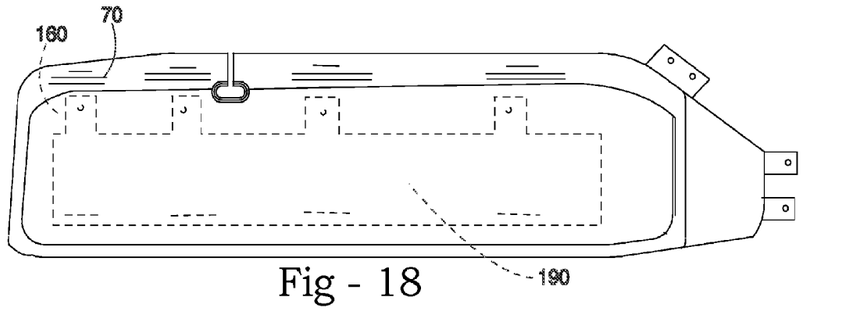
FIGS. 18-20 show steps in the process of making the air bag of FIG. 17.
Figure 19:
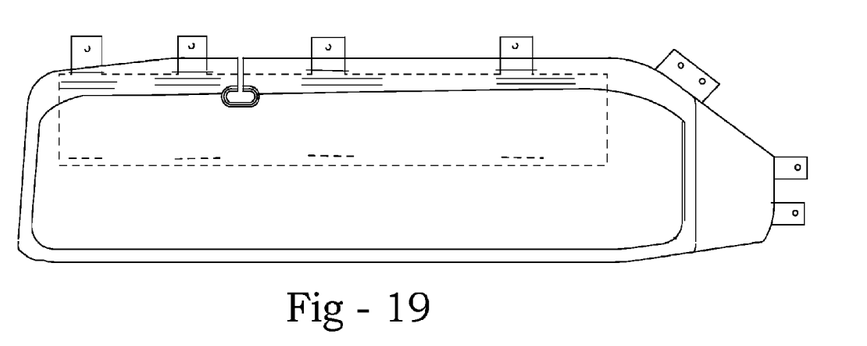
Figure 19A:
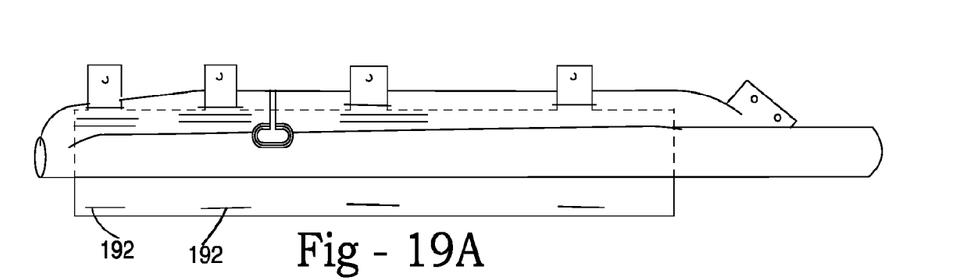
Figure 20:
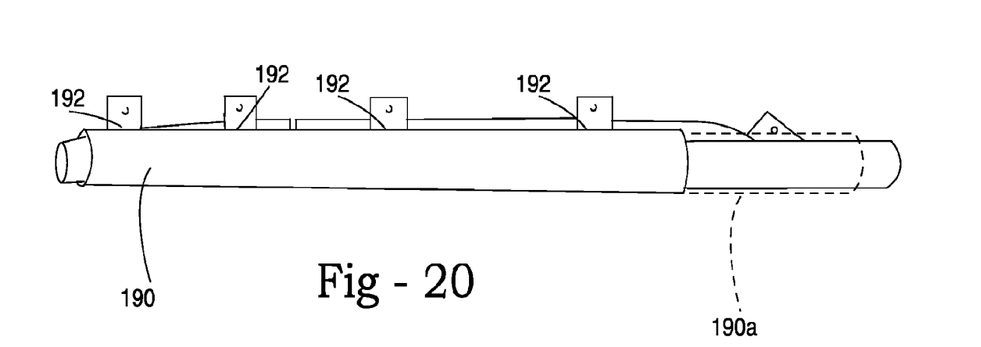

FIG. 14 shows another embodiment of the invention usable with the bags of FIG. 10 with a single slot at a mounting location or multiple slots as shown in FIG. 11. For the purpose of illustration, the air bag of FIG. 14 shows both the single slit/slot and the multiple slit/slot. FIG. 14 also shows an elongated piece of material panel 170 with a plurality of tabs 160 extending upwardly. In FIG. 15 the material panel 170 with tabs has been moved just under the upper slots 70 in the air bag. In FIG. 16 the tabs have been moved through corresponding slits 70 extending upward behind the main panels of the air bag in the same orientation as the tabs would take if the tabs were sewn on. After the bag is rolled or folded it is slid into a flexible casing such as 80 of FIG. 4. FIG. 17 shows another embodiment of the invention. A piece of material (material panel) 190 is shown apart from the air bag, the air bag includes a plurality of tabs 160. The material panel 190 is similar to the material panel 170 with the exception it is wider and includes a plurality of slits 192 near the bottom of the material, equal in number to the number of tabs 160. In FIG. 18, the material panel 190 has been placed under the air bag and tabs 160 aligned with slits 70. Material panel 190a is a possible extension of the material panel 190 which would permit the material to support the right hand side of the air bag after it is rolled or folded. A similar material panel or extension could also be placed on the left-hand side of the air bag. In FIG. 19 the tabs 160 have been slid through uppermost slit 70, the air bag is not yet folded. Subsequently, the bag is folded or rolled up from its bottom toward the tabs. After the bag is folded or rolled into a compact cylindrical-like shape, the bottom of the material panel 190 (the material panel was initially below the main portions of the air bag) is pulled upward about the folded or rolled air bag and the tabs 160 are slipped into a corresponding slit 192a; this configuration is shown in FIG. 20. The air bag, with this alternate tab-support structure when inflated will be able to stretch and extend by virtue of the slit at the top of the air bag. This combination with the use of the material panel 190 replaces the prior art type of casing previously used to maintain the air bag in its folded condition. The air bag of FIG. 17 can also include one or more slots such as shown in FIGS. 10 and 11.

Many changes and modifications in the above-described embodiment of the invention can, of course, be carried out without departing from the scope thereof. Accordingly, that scope is intended to be limited only by the scope of the appended claims.

The invention claimed is:

1. An air bag (20) for use in a vehicle (200) comprising:
   a border region (22) having a top (24) situated above all inflatable regions (30, 30a, 30b); the top of the border region configured to be secured directly or indirectly to a portion of the vehicle or component of the vehicle;
   wherein the top (24) of the border region includes at least one closed slit configured to open on deployment of the airbag, the slit being located below any mounting tab, which enables the airbag in the vicinity of the at least one slit to locally stretch without breaking when under stress the opened slit increasing the height of the airbag thereby lowering the inflatable regions.

2. The air bag according to claim 1 further including at least one tab secured to the top of the border region above the top-most slit or formed as an integral component thereof; wherein at least one tab is configured to be mounted to the vehicle or component of the vehicle.

3. The air bag according to claim 2 wherein the at least one slit is located proximate the at least one tab.

4. The air bag according to claim 3 wherein the at least one slit is located directly below the at least one tab.

5. The air bag according to claim 1 wherein the air bag is configured to be mounted proximate the roof rail of a vehicle.

6. The air bag according to claim 1 wherein the border region is not inflatable.

7. The air bag according to claim 1 including a plurality of inflatable regions.

8. An air bag (20) for use in a vehicle (200) comprising:
   a border region (22) having a top (24) situated above all inflatable regions (30, 30a, 30b); the top of the border region configured to be secured directly or indirectly to a portion of the vehicle or component of the vehicle;
   wherein the top (24) of the border region (22) includes a plurality of closed slits configured to open on deployment of the airbag, the plurality of closed slits being located below a mounting tab, the tab being secured to the top of the border region above a top-most slit or formed as an integral component thereof; wherein the tab is configured to be mounted to the vehicle or component of the vehicle which enables the airbag in the vicinity of the plurality of slits to locally stretch without breaking when under stress the plurality of opened slits increasing the height of the airbag thereby lowering the inflatable regions below the tab.

9. The air bag according to claim 8 including a plurality of tabs with a singular or plurality of slits positioned in the border region below each tab.

10. An air bag (20) for use in a vehicle (200) comprising:
    a border region (22) having a top (24) situated above at least one inflatable region (30, 30a, 30b); the top of the border region configured to be secured directly or indirectly to a portion of the vehicle or component of the vehicle;
    the border region below any mounting tab includes a discontinuity including at least one closed slit configured to open during the airbag deployment which enables the air bag to locally stretch without tearing when under stress to increase the height of the airbag thereby lowering the inflatable regions;
    wherein the discontinuity includes at least one set of slits, each set having two or more closed slits, one slit above the other slit, that on deployment of the airbag open, each slit opening effectively increasing the height of the airbag.

11. An air bag (20) for use in a vehicle (200) comprising:
    a border region (22) having a top (24) situated above at least one inflatable region (30, 30a, 30b); the top of the border region configured to be secured directly or indirectly to a portion of the vehicle or component of the vehicle;
    the border region below any mounting tab includes a discontinuity including at least one closed slit configured to open during the airbag deployment which enables the air bag to locally stretch without tearing when under stress to increase the height of the airbag thereby lowering the inflatable regions;
    wherein the discontinuity includes a plurality of sets of slits, one set being below each mounting tab located on the top of the border region.

* * * * *